(12) United States Patent
Corollaro et al.

(10) Patent No.: US 12,735,050 B2
(45) Date of Patent: Sep. 15, 2026

(54) TIRE MODELS FOR SIMULATIONS ON WET SURFACES

(71) Applicant: Bridgestone Europe NV/SA [BE/BE], Zaventem (BE)

(72) Inventors: Alfredo Corollaro, Rome (IT); Carlo Alberto Marino, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 184 days.

(21) Appl. No.: 18/702,399

(22) PCT Filed: Oct. 31, 2022

(86) PCT No.: PCT/EP2022/080338
§ 371 (c)(1),
(2) Date: Apr. 18, 2024

(87) PCT Pub. No.: WO2023/073227
PCT Pub. Date: May 4, 2023

(65) Prior Publication Data

US 2024/0409104 A1 Dec. 12, 2024

(30) Foreign Application Priority Data

Nov. 1, 2021 (EP) .................................... 21205836

(51) Int. Cl.
*B60W 40/13* (2012.01)
*B60W 40/064* (2012.01)
*B60W 40/068* (2012.01)

(52) U.S. Cl.
CPC .......... *B60W 40/13* (2013.01); *B60W 40/064* (2013.01); *B60W 40/068* (2013.01); *B60W 2530/20* (2013.01)

(58) Field of Classification Search
CPC .. B60W 40/13; B60W 40/064; B60W 40/068; B60W 2530/20; B60W 40/12;
(Continued)

(56) References Cited

U.S. PATENT DOCUMENTS 12,454,310 B2 * 10/2025 Yajima .................... B62D 6/00

FOREIGN PATENT DOCUMENTS

| | | | | |
|---|---|---|---|---|
| DE | 102005046612 | A1 | | 4/2007 |
| JP | 2016057233 | A | * | 4/2016 |
| RU | 2661555 | C1 | | 7/2018 |

OTHER PUBLICATIONS

JP-2016057233-A—English Translation (Year: 2016).*
(Continued)

*Primary Examiner* — Scott A Reinbold
(74) *Attorney, Agent, or Firm* — Patterson Intellectual Property Law, PC

(57) ABSTRACT

A computer-implemented method of predicting the behaviour of a vehicle tire on a wet road surface comprises: providing a computer-implemented tire model; inputting a vertical tire load and a longitudinal tire velocity to the tire model; using the computer-implemented tire model to calculate a predicted tire cornering force in terms of the lateral load-dependent friction coefficient and/or cornering stiffness being dependent on the vertical tire load and being dependent on the longitudinal tire velocity; and outputting the predicted tire cornering force from the computer-implemented tire model.

17 Claims, 15 Drawing Sheets

(58) Field of Classification Search
CPC ... B60T 2210/12; B60T 2270/86; B60T 8/172
USPC .......................................................... 701/71
See application file for complete search history.

(56) References Cited

OTHER PUBLICATIONS

Salehi Marzieh et al: "A New Horizon for Evaluating Tire Grip Within a Laboratory Environment" Tri Bo Logy Letters, Springer US, New York, vol. 68, No. 1, Feb. 12, 2020 (Feb. 12, 2020), XP037094033, ISSN: 1023-8883, DOI: 10.1007/SII249-020-1273-5 [retrieved on Feb. 12, 2020] paragraphs [02.2], [3.4.3]; figures 1,4,7,11,12; table 2.
Ruzinskas Andrius et al: "Magic Formula Tyre Model Application for a Tyre-Ice Interaction" , Procedia Engineering, Elsevier BV, NL, vol. 187, May 11, 2017 (May 11, 2017), pp. 335-341, XP085008991, ISSN: 1877-7058, DOI: 10.1016/J.PROENG.2017.04.383the whole document.
Porcel A et al: "Tyre model for vehicle simulation: overview and real time solution for critical situations", Proceedings of the 2001 IEEE International Conference on Control Applications. CCA'0I. Mexico City, Mexico, Sep. 5-7, 2001; [IEEE International Conference on Control Applications], New York, NY : IEEE, US, Sep. 5, 2001 (Sep. 5, 2001), pp. 817-822, XP010571075,DOI: 10.1109/CCA.2001.973970ISBN: 978-0-7803-6733-3, the whole document.
Acosta Manuel et al: "Tire lateral force estimation and grip potential identification using Neural Networks, Extended Kalman Filter, and Recursive Least Squares", Neural Computing and Applications, Springer London, London, vol. 30, No. 11, Mar. 13, 2017 (Mar. 13, 2017), pp. 3445-3465, XP036641014, ISSN: 0941-0643, DOI: 10.1007/S00521-017-2932-9 [retrieved on Mar. 13, 2017] paragraph [04.5].
Kissai Moad et al: "A new linear tire model with varying parameters", 2017 2nd IEEE International Conference on Intelligent Transportation Engineering (ICITE), IEEE, Sep. 1, 2017 (Sep. 1, 2017), pp. 108-115, XP033160630,DOI: 10.1109/ICITE.2017.8056891 ISBN: 978-1-5090-6272-0, [retrieved on Oct. 2, 2017] the whole document.
Magic Formula Tyre Model Application for a Tyre-Ice Interaction, Pro cedia Engineering, 2017, vol. 187, 335-341.
Japanese Office Action, corresponding application No. JP2024539354A, Jun. 24, 2025.

* cited by examiner

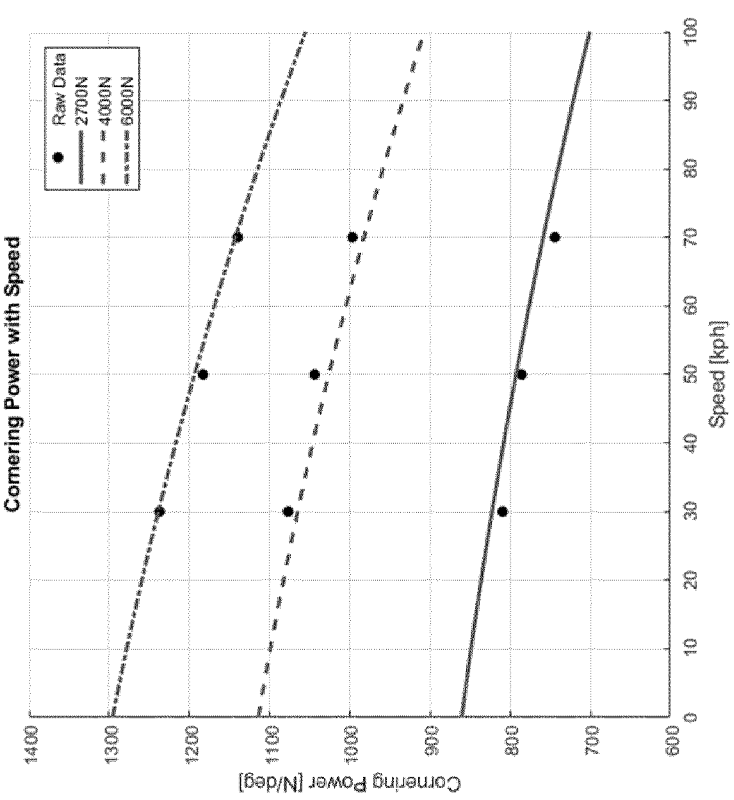
Figure 8
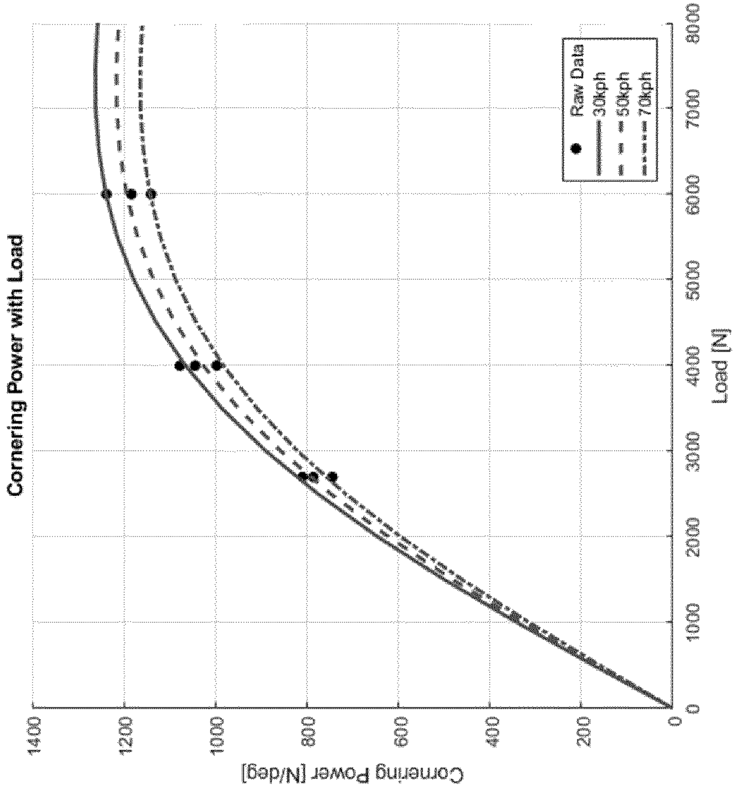

TIRE MODELS FOR SIMULATIONS ON WET SURFACES

TECHNICAL FIELD

The present invention relates to computer-implemented methods of predicting the behaviour of a vehicle tire on a wet road surface.

BACKGROUND

It is known that in his book Tire and Vehicle Dynamics published in 1987, Professor H. Pacejka presents the now well-known "Magic Formula" for modelling interaction between a vehicle tire and the road. This empirical model predicts braking/traction and cornering force dependent on longitudinal and lateral slips, vertical load and camber angle.

There are various commercial software products available to run vehicle simulations to assess ride and handling performance, which are semi-empirical tire performance models based on the Pacejka Magic Formula. These vehicle simulations are limited to performance on dry road surfaces only. The Magic Formula approach has not been found to give a good correlation with experimental results for a tire running on a wet surface.

Some complex models have been proposed in the literature for predicting tire forces on a low coefficient surface, for example taking into account complex phenomena such as hydrodynamic lubrication. There remains a need for a workable approach to tire modelling that can reasonably simulate the behaviour of a tire on a wet surface, and even in real-time.

The present invention seeks to provide a model for predicting tire behaviour on wet surfaces.

SUMMARY OF THE INVENTION

According to a first aspect of the present invention there is provided a computer-implemented method of predicting the behaviour of a vehicle tire on a wet road surface, the method comprising: providing a computer-implemented tire model; inputting a vertical tire load ($F_z$) and a longitudinal tire velocity (v) to the tire model; using the computer-implemented tire model to calculate a predicted tire grip in terms of the lateral load-dependent friction coefficient ($\mu_y$) being dependent on the vertical tire load ($F_z$) and being dependent on the longitudinal tire velocity (v); and outputting the predicted tire grip from the computer-implemented tire model.

Thus it has been appreciated that an improved prediction of tire grip may be provided by such a computer-implemented tire model when the lateral load-dependent friction coefficient ($\mu_y$) is calculated dependent on the longitudinal tire velocity (v) as well as the vertical tire load ($F_z$). In this method, the longitudinal tire velocity (v) is taken as a direct input to the tire model and the tire grip is modified dependent on the velocity. It has therefore been recognised that the longitudinal tire velocity (v), which represents the vehicle speed, is directly responsible for changing the lateral force exerted on the tire at its contact patch with a wet road, and hence tire grip in wet driving conditions. This is not taken into account in current versions of the Magic Formula approach.

The predicted tire grip output from the computer-implemented tire model may be used in vehicle simulations to predict tire behaviour on a wet road in a way that has not previously been achieved. This can reduce the amount of physical testing needed on tires.

In at least some embodiments, the lateral load-dependent friction coefficient ($\mu_y$) is calculated based on a first term that has a linear dependence on the vertical tire load ($F_z$) and another term being dependent on the longitudinal tire velocity (v) in a linear and/or non-linear way. For example, the other term may be a second term that has a linear dependence on the longitudinal tire velocity (v). For example, in addition or alternatively, the other term may be a third term that has a quadratic dependence on the longitudinal tire velocity (v). For example, in addition or alternatively, the other term may have a higher order (i.e. n>2) non-linear dependence on the longitudinal tire velocity (v). It has therefore been recognised that tire grip on a wet road surface may be modified as a linear and/or non-linear function of the longitudinal tire velocity. In some preferred embodiments, the third term is always included in the calculation as a strong quadratic dependence on vehicle speed has been observed for tire grip on a wet road surface.

In at least some embodiments, in addition or alternatively, the lateral load-dependent friction coefficient ($\mu_y$) is calculated based on a mixed term that is dependent on a product of the vertical tire load ($F_z$) and the longitudinal tire velocity (v). It has therefore been recognised that tire grip on a wet road surface may be modified as a function of this mixed term. This is based on an observation from real data that the tire grip on a wet road surface can increase or decrease as a function of vertical tire load depending on the vehicle speed.

In any of the embodiments above, the lateral load-dependent friction coefficient ($\mu_y$) may be calculated as a sum of one or more of the first, second, third and mixed terms.

It has also been appreciated that an improved prediction of cornering stiffness may be provided by such a computer-implemented tire model when the longitudinal tire velocity (v) is taken into account as an input to the model.

In at least some embodiments, in addition or alternatively, the method further comprises: using the computer-implemented tire model to calculate a predicted cornering stiffness dependent on the vertical tire load ($F_z$) and on the longitudinal tire velocity (v); and outputting the predicted cornering stiffness from the computer-implemented tire model. It has therefore been recognised that the longitudinal tire velocity (v), which represents the vehicle speed, is directly responsible for changing the cornering stiffness in wet driving conditions. This is another significant deviation from current versions of the Magic Formula approach.

In at least some embodiments, the cornering stiffness is calculated based on a primary term that has a linear dependence on the vertical tire load ($F_z$) and a secondary term that has a linear dependence on the longitudinal tire velocity (v), and optionally a tertiary term that has a quadratic dependence on the longitudinal tire velocity (v). It has therefore been recognised that cornering stiffness on a wet road surface may be modified as a linear and/or non-linear function of the longitudinal tire velocity. In some embodiments, the tertiary term is omitted from the calculation as a strong non-linear dependence on vehicle speed has not been observed for cornering stiffness on a wet road surface.

In any of the embodiments above, the cornering stiffness is calculated as a sum of one or more of the primary, secondary and tertiary terms.

Combining various of the embodiments above, it will be appreciated that the computer-implemented tire model is capable of predicting both the lateral load-dependent friction coefficient ($\mu_y$), that is a synonym of grip, and the cornering stiffness. As a result, such methods are particularly wellsuited to predicting the overall cornering force. Thus, in some preferred embodiments, the method comprises: using the computer-implemented tire model to calculate a predicted tire cornering force in terms of both the lateral load-dependent friction coefficient ($\mu_y$) and cornering stiffness ($K_y$) being dependent on the vertical tire load ($F_z$) and being dependent on the longitudinal tire velocity (v); and outputting the predicted tire cornering force from the computer-implemented tire model.

In at least some embodiments, the method uses the computer-implemented tire model to calculate a predicted tire grip (and optionally to calculate a predicted cornering stiffness) without inputting a tire temperature to the computer-implemented tire model. Thus, it has been recognised that an improved prediction of tire grip (and optionally cornering stiffness) is based on a direct dependence on vehicle speed without considering tire temperature, as this has been found not to be predominant on wet surfaces.

In at least some embodiments, the method comprises: providing a computer-implemented tire model that includes one or more dimensionless coefficients that have been pre-calculated based on experimental data collected for a given tire on a wet road surface. Furthermore, these dimensionless coefficients may have been pre-calculated based on experimental data collected for a given tire on a wet road surface at multiple different longitudinal tire velocities.

In some examples, the lateral load-dependent friction coefficient ($\mu_y$) is calculated based on a second term that has a linear dependence on the longitudinal tire velocity (v) as a product of a first dimensionless coefficient ("$1^{st}$ grip micro parameter") that has been calculated based on experimental data collected for a tire on a wet road surface, and a third term that has a quadratic dependence on the longitudinal tire velocity (v) as a product of a second dimensionless coefficient ("$2^{nd}$ grip micro parameter") that has been calculated based on experimental data collected for a tire on a wet road surface. For example, the lateral load-dependent friction coefficient ($\mu_y$) is calculated based on a mixed term that is dependent on a product of the vertical tire load ($F_z$), the longitudinal tire velocity (v) and a third dimensionless coefficient ("$3^{rd}$ grip micro parameter") that has been calculated based on experimental data collected for a tire on a wet road surface. Thus, in some examples, the computer-implemented tire model may include at least three dimensionless coefficients relating to grip that have been calculated based on experimental data collected for a tire on a wet road surface and are therefore different to any dimensionless coefficients included in existing versions of the Magic Formula.

In some examples, the cornering stiffness is calculated based on a secondary term that has a linear dependence on the longitudinal tire velocity (v) as a product of a first dimensionless coefficient ("$1^{st}$ stiffness micro parameter") that has been calculated based on experimental data collected for a tire on a wet road surface, and a tertiary term that has a quadratic dependence on the longitudinal tire velocity (v) as a product of a second dimensionless coefficient ("$2^{nd}$ stiffness micro parameter") that has been calculated based on experimental data collected for a tire on a wet road surface. Thus the computer-implemented tire model may include one or two dimensionless coefficients relating to cornering stiffness that have been calculated based on experimental data collected for a tire on a wet road surface and are therefore different to any dimensionless coefficients included in existing versions of the Magic Formula.

In at least some embodiments, one or more dimensionless coefficients may be dependent on a tire type. The tire type may include at least one of a tire size, tire manufacturer, tire age, tire tread pattern (and its design), tire finish, etc. The one or more dimensionless coefficients may have been calculated based on experimental data collected for that particular tire type on a wet road surface.

Methods as disclosed herein may find use for a variety of purposes, including the running of vehicle simulations, and implementation of driving simulators that allow a human driver to virtually drive a vehicle on a wet road. As the method takes the vehicle speed as an input to the tire model, the output(s) provided by the method can adapt in real-time to changes in speed. Thus, in at least some embodiments, the method comprises: inputting a longitudinal tire velocity (v) to the tire model in real time; and outputting the predicted tire grip from the computer-implemented tire model in real time. Optionally, the predicted cornering stiffness is also output from the computer-implemented tire model in real time.

The computer-implemented tire models disclosed herein have been found to provide accurate outputs across a range of typical vehicle speeds, when compared to experimental data obtained for tires on wet roads. In at least some embodiments, inputting a longitudinal tire velocity (v) to the tire model comprises: selecting a longitudinal tire velocity (v) in the range of 30-70 kph.

According to the present disclosure, what is meant by a wet road surface is a road surface covered by a uniform and constant 2.0 mm layer of water.

According to a second aspect of the present invention there is provided a computer system for predicting the behaviour of a vehicle tire on a wet road surface, the system implementing a method as disclosed herein. The computer system may comprise a processor and a tangible memory storing computer-executable instructions that, when executed by the processor, cause the system to implement any of the methods as disclosed herein.

According to a further aspect of the present invention there is provided a vehicle driving simulator comprising such a computer system. As mentioned above, in at least some embodiments the vehicle speed may be input to the tire model in real time. In at least some embodiments, the vehicle driving simulator may comprise a driver interface configured for a human driver to input a vehicle speed to the computer system in real time. This vehicle speed may be taken by the computer system (i.e. a processor thereof) and used to input a longitudinal tire velocity (v) to the tire model in real time.

According to a further aspect of the present invention there is provided a computer software product configured to implement any of the methods as disclosed herein.

BRIEF DESCRIPTION OF THE DRAWINGS

FIGS. 2-8 show experimental data collected for a first tire type on a wet road surface and compared with various tire models, in which:

FIG. 2 compares the experimental data with the original (1987) Pacejka formulation of a tire model;

FIG. 3 compares the experimental data with a computer-implemented tire model according to a first example of the present invention;

FIG. 4 compares the experimental data with a computer-implemented tire model according to a second example of the present invention;

FIG. 5 compares the experimental data with a computer-implemented tire model according to a third example of the present invention;

FIG. 6 compares the experimental data with a computer-implemented tire model according to a fourth example of the present invention;

FIG. 7 compares the experimental data with a computer-implemented tire model according to another example of the present invention in terms of cornering stiffness;

FIG. 8 compares the experimental data with a computer-implemented tire model according to yet another example of the present invention in terms of cornering stiffness;

DETAILED DESCRIPTION

Figure 1:
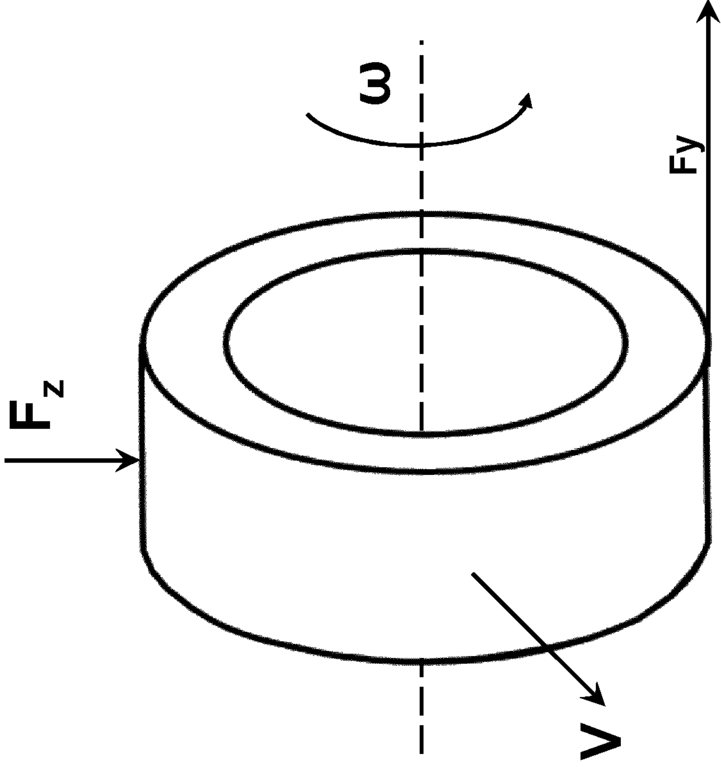
FIG. 1 shows a vehicle tire and some of the main parameters involved in a computer-implemented tire model.

It is shown in FIG. 1 how a vehicle tire on a wet road surface is under the influence of a vertical tire load $F_z$ and has a longitudinal tire velocity v as determined by the vehicle speed. The lateral force $F_y$ is linked to the vertical tire load $F_z$ through the lateral load-dependent friction coefficient μy, which acts to dictate the tire's grip on the road surface. The lateral force $F_y$ is also known as the cornering force. According to the methods described herein, a computer-implemented tire model is used to calculate a predicted tire grip in terms of the lateral load-dependent friction coefficient $\mu_y$ being dependent on the vertical tire load $F_z$ and on the longitudinal tire velocity v. It can be seen that longitudinal tire velocity v is distinct from the tire's angular velocity ω.

FIGS. 2-8 show experimental data collected for a first tire type (Bridgestone tire type 1) on a wet road surface and compared with various tire models.

Figure 2:
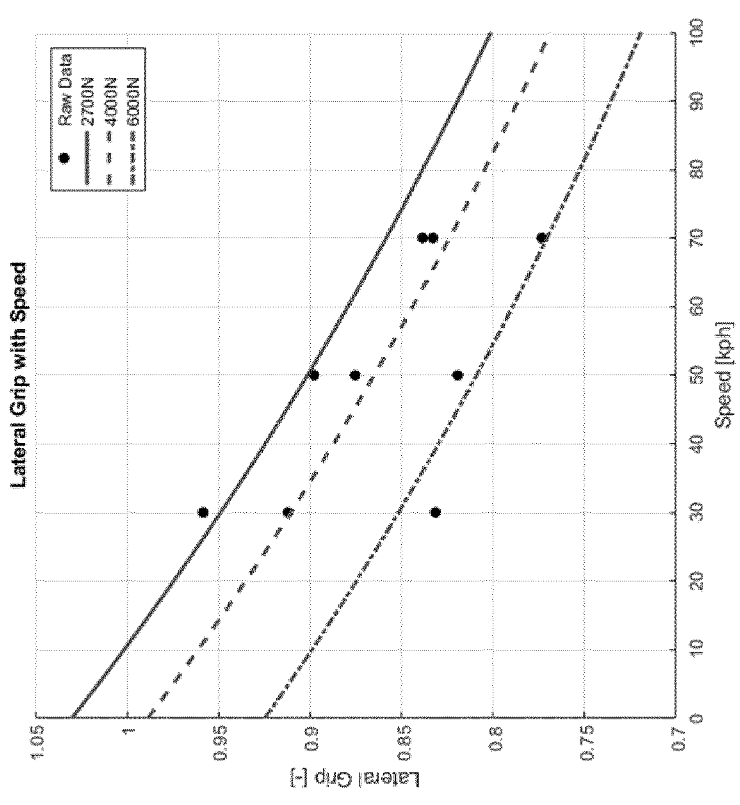
Figure 2:
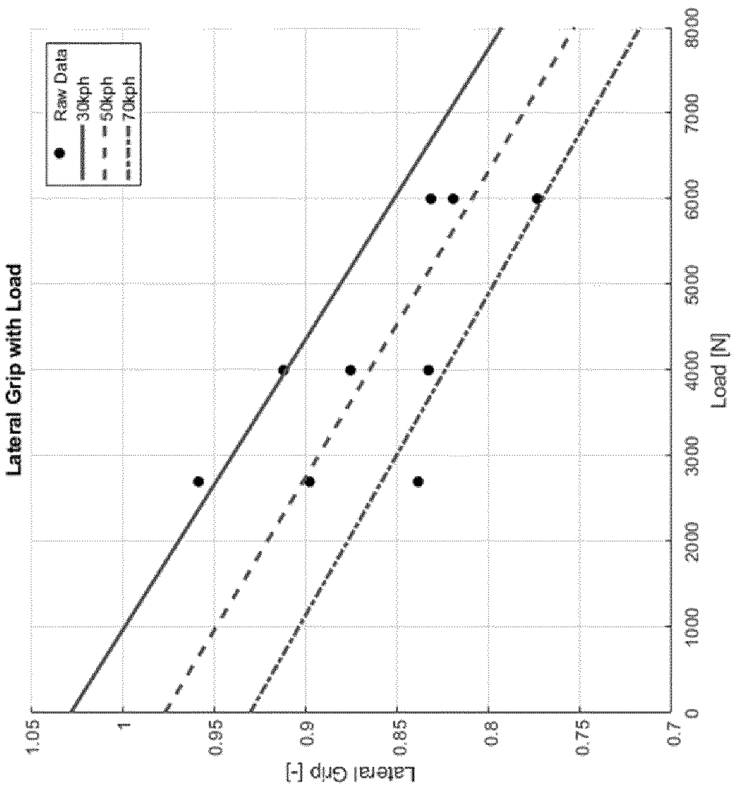

FIG. 2 compares the experimental data with the original (1987) Pacejka formulation of a tire model i.e. the so-called "Magic Formula" in which:

$$\mu_y = (p_{Dy1} + p_{Dy2} \cdot df_z)(1 - p_{Dy3} \cdot \gamma^2) \cdot \lambda_{\mu y} \cdot \frac{1}{(1 + \lambda_{\mu y} \cdot V/V_0)} \quad \text{(Eq. 1)}$$

This tire model predicts tire grip in terms of the lateral load-dependent friction coefficient ($\mu_y$) being dependent on the vertical tire load ($f_z$), and camber angle (γ) without any dependence on vehicle speed. A scaling factor $\lambda_{\mu y}$ is also present. It can be seen from FIG. 2 the tire model does not provide a good fit with the experimental data collected on a wet road surface.

Figure 3:
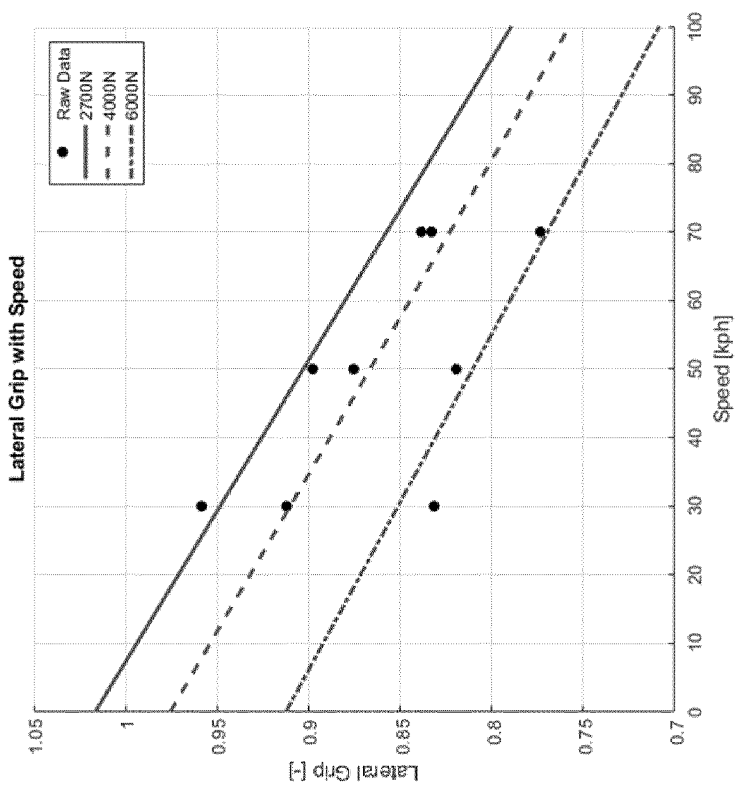
Figure 3:
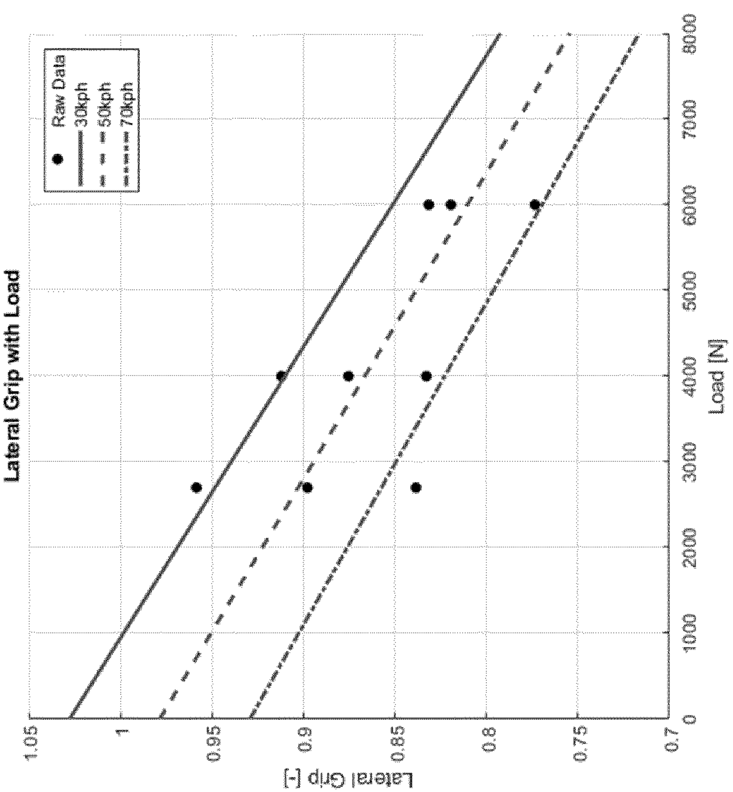

FIG. 3 compares the experimental data with a computer-implemented tire model according to a first example of the present invention. In this first example, the tire model predicts tire grip in terms of the lateral load-dependent friction coefficient $\mu_y$ being a linear function of the vertical tire load $f_z$ and a linear function of the longitudinal tire velocity v:

$$\mu_y = (p_{Dy1} + p_{Dy2} \cdot df_z)(1 - p_{Dy3} \cdot \gamma^2) \cdot \lambda_{\mu y} \cdot (1 + p_{Vdy1} \cdot dv) \quad \text{(Eq. 2)}$$

In this first example, the tire model includes a first term that has a linear dependence on the vertical tire load $f_z$ and a second term that has a linear dependence on the longitudinal tire velocity v. Compared to FIG. 2, there is some improvement in how the tire model fits with the experimental data collected on a wet road surface.

Figure 4:
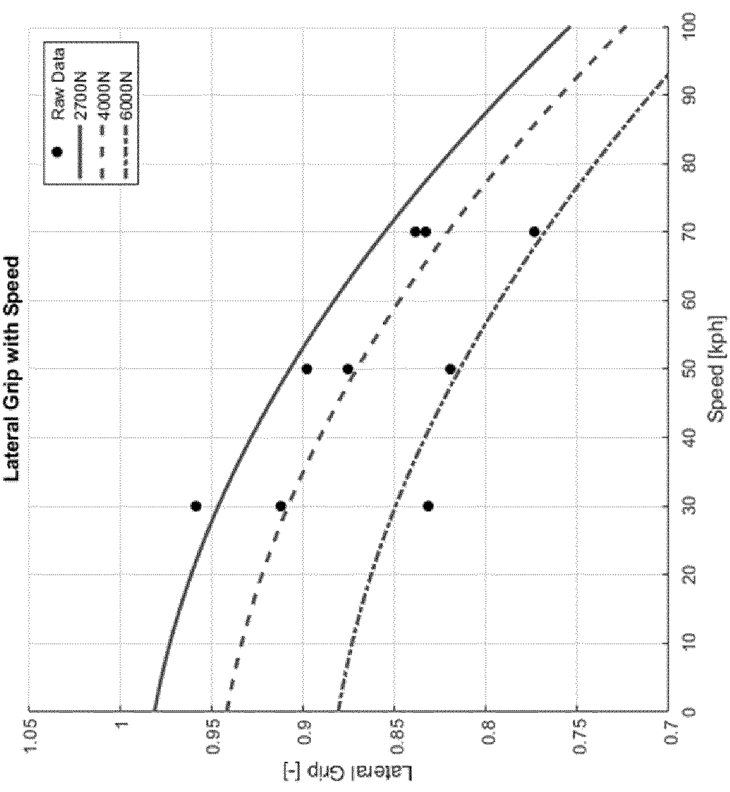
Figure 4:
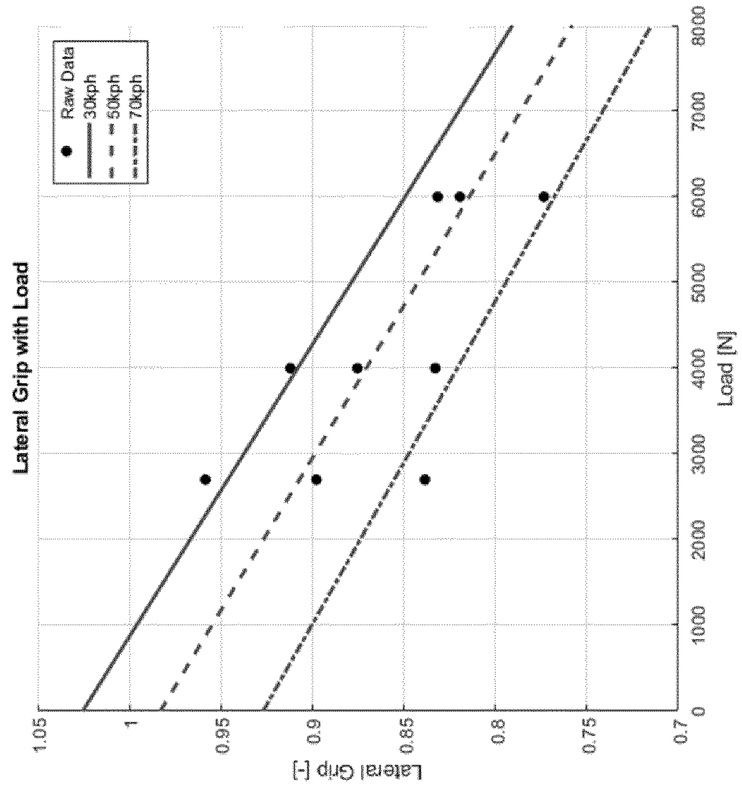

FIG. 4 compares the experimental data with a computer-implemented tire model according to a second example of the present invention. In this second example, the tire model predicts tire grip in terms of the lateral load-dependent friction coefficient $\mu_y$ being a linear function of the vertical tire load $f_z$ and a function of the longitudinal tire velocity v including both linear and non-linear components:

$$\mu_y = (p_{Dy1} + p_{Dy2} \cdot df_z)(1 - p_{Dy3} \cdot \gamma^2) \cdot \lambda_{\mu y} \cdot (1 + p_{Vdy1} \cdot dv + p_{Vdy2} \cdot dv^2) \quad \text{(Eq. 3)}$$

In this second example, the tire model includes a first term that has a linear dependence on the vertical tire load $f_z$, a second term that has a linear dependence on the longitudinal tire velocity v, and a third term that has a quadratic dependence on the longitudinal tire velocity v. Compared to FIG. 2, there is improvement in how the tire model fits with the experimental data collected on a wet road surface.

Figure 5:
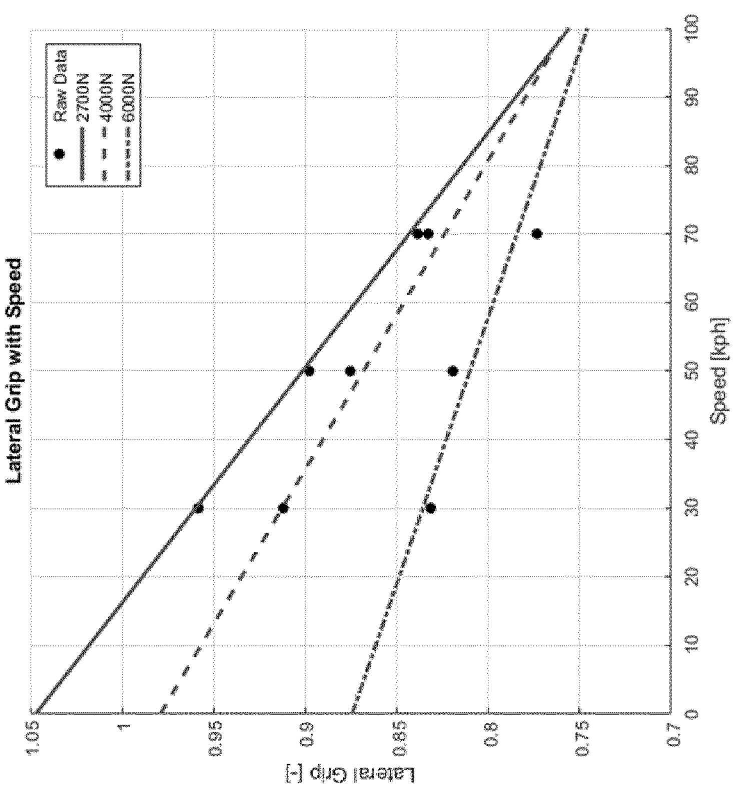
Figure 5:
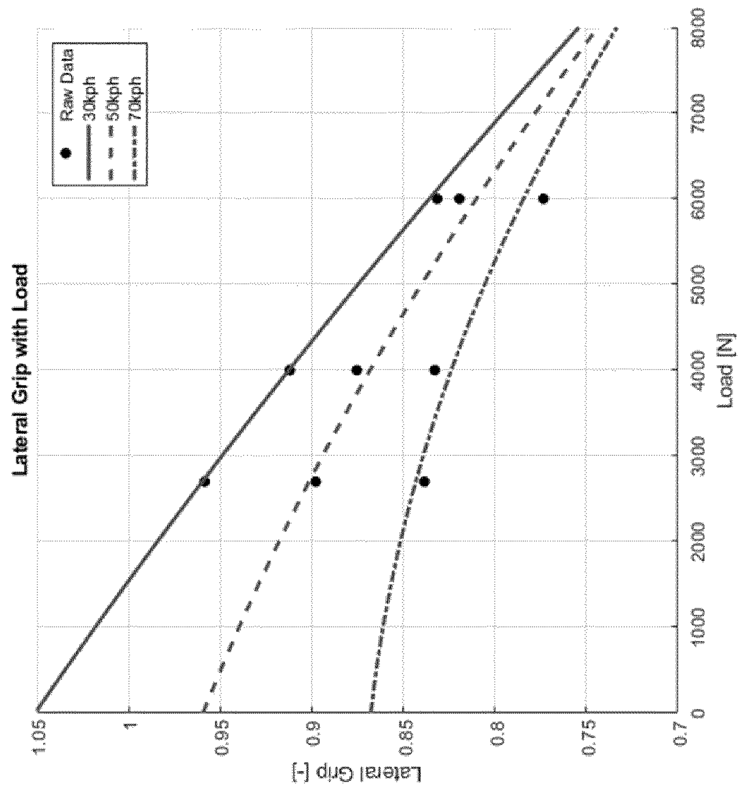

FIG. 5 compares the experimental data with a computer-implemented tire model according to a third example of the present invention. In this third example, the tire model predicts tire grip in terms of the lateral load-dependent friction coefficient $\mu_y$ being a linear function of the vertical tire load $f_z$ and longitudinal tire velocity v, and also including a mixed term:

$$\mu_y = (p_{Dy1} + p_{Dy2} \cdot df_z)(1 - p_{Dy3} \cdot \gamma^2) \cdot \lambda_{\mu y} \cdot (1 + p_{Vdy1} \cdot dv + p_{Vdy3} \cdot dv \cdot df_z) \quad \text{(Eq. 4)}$$

In this third example, the tire model includes a first term that has a linear dependence on the vertical tire load $f_z$, a second term that has a linear dependence on the longitudinal tire velocity v, and a mixed term that is dependent on a product of the vertical tire load $f_z$ and the longitudinal tire velocity v. Compared to FIG. 2, there is improvement in how the tire model fits with the experimental data collected on a wet road surface.

Figure 6:
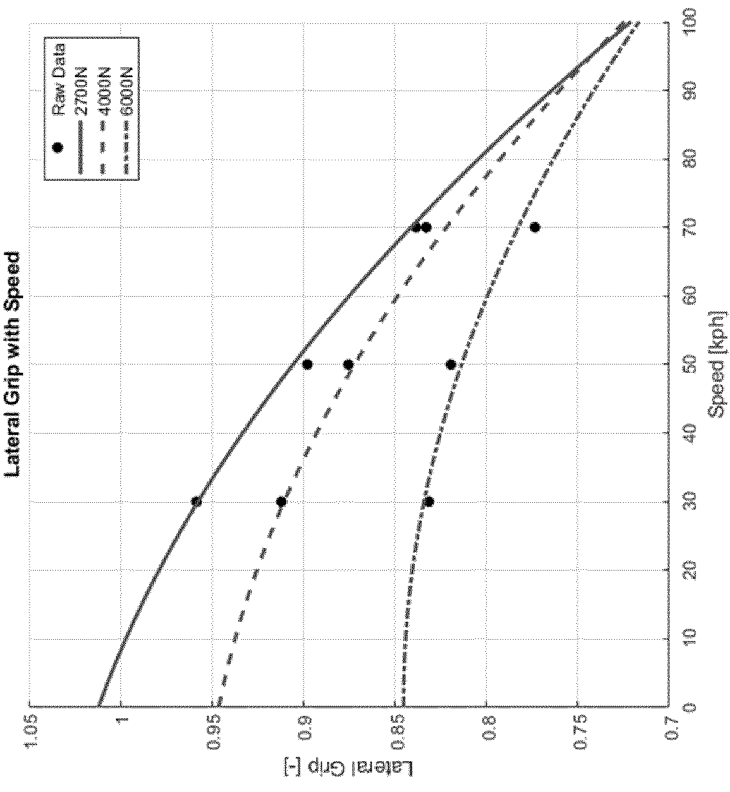
Figure 6:
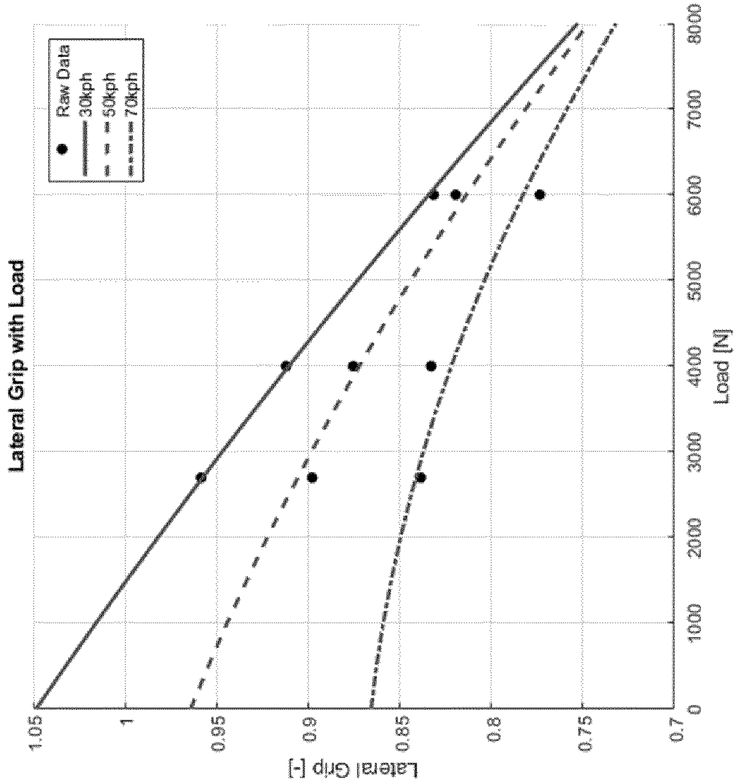

FIG. 6 compares the experimental data with a computer-implemented tire model according to a fourth example of the present invention. In this fourth example, the tire model predicts tire grip in terms of the lateral load-dependent friction coefficient $\mu_y$ being a linear function of the vertical tire load $f_z$, a linear and non-linear function of the longitudinal tire velocity v, and also including a mixed term that is dependent on a product of the vertical tire load $f_z$ and the longitudinal tire velocity v:

$$\mu_y = (p_{Dy1} + p_{Dy2} \cdot df_z)(1 - p_{Dy3} \cdot \gamma^2) \cdot \lambda_{\mu y} \cdot (1 + p_{Vdy1} \cdot dv + p_{Vdy2} \cdot dv^2 + p_{Vdy3} \cdot dv \cdot df_z) \quad \text{(Eq. 5)}$$

In this fourth example, the tire model includes the first, second and third terms, as well as the mixed term, described above. Compared to FIG. 2, it can be seen how this tire model fits very well with the experimental data collected on a wet road surface.

In each of the equations 1-5 above, there is included some dimensionless coefficients $p_{Dy1}$, $p_{Dy2}$, $p_{Dy3}$ in the first term that depends on vertical tire load $f_z$. It is already known for tire models based on the "Magic Formula" to include such dimensionless coefficients, but previously these coefficients were pre-calculated based on experimental data collected on a dry road surface. In the present examples, the dimensionless coefficients $p_{Dy1}$, $p_{Dy2}$, $p_{Dy3}$ are pre-calculated based on experimental data collected for a given tire type on a wet road surface, and thus differ from those already known for tire models based on the "Magic Formula". This follows from a recognition that the grip level of a tire (i.e. the lateral friction coefficient) reaches different values on dry surfaces as compared to wet surfaces, thus the absolute values of these coefficients change if you test a tire on a surface dry or on a wet surface. The experimental data used to pre-calculate these dimensionless coefficients may relate to a single vehicle speed or multiple vehicle speeds, for example at least three different vehicle speeds.

In each of the equations 2-5 above, there is included some further dimensionless coefficients $p_{vdy1}$, $p_{vdy2}$, $p_{vdy3}$ in the additional speed-dependent terms, wherein $p_{vdy1}$ is included in the second (linear) term, $p_{vdy2}$ is included in the third (non-linear) term, and $p_{vdy3}$ is included in the mixed term. These further dimensionless coefficients are pre-calculated based on experimental data collected for a given tire type on a wet road surface. Furthermore, due to the speed-dependence of these additional terms, the experimental data used to pre-calculate these dimensionless coefficients may relate to multiple vehicle speeds, for example at least three different vehicle speeds.

The way in which such dimensionless coefficients are pre-calculated from experimental data is generally known in the art. For example, a least squares fitting or other iterative fitting technique may be employed.

Figure 7:
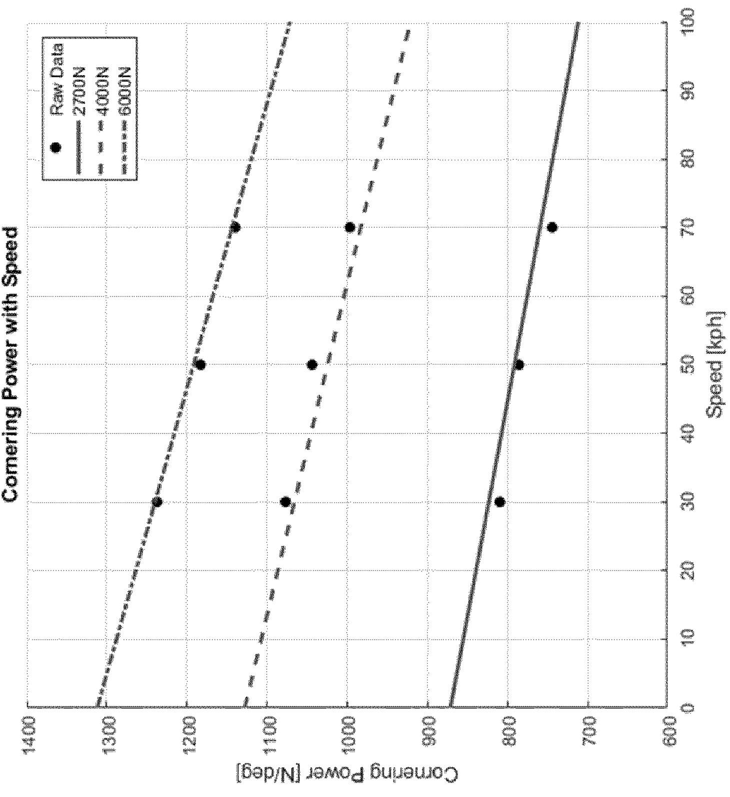
Figure 7:
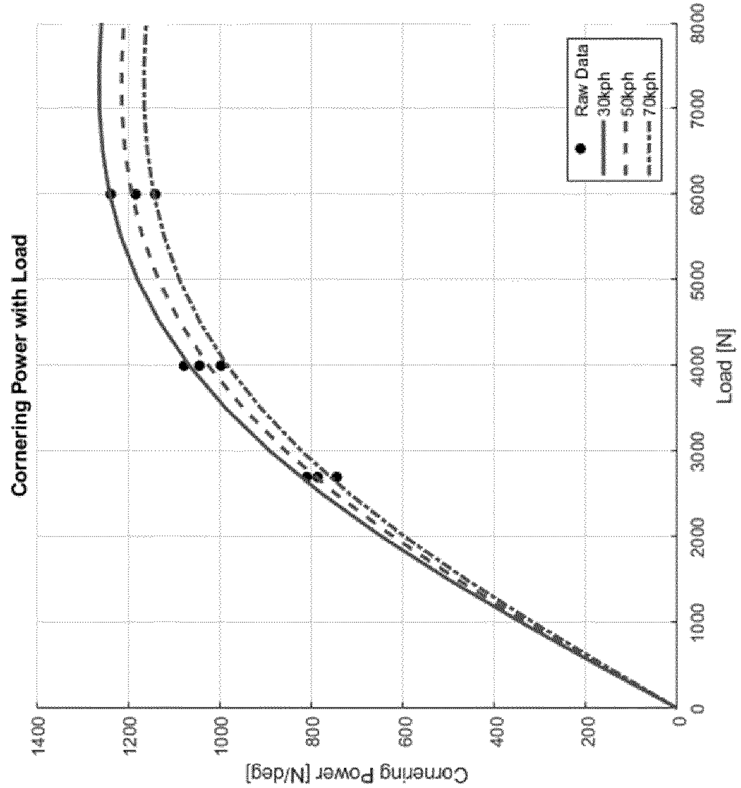
Figure 9:
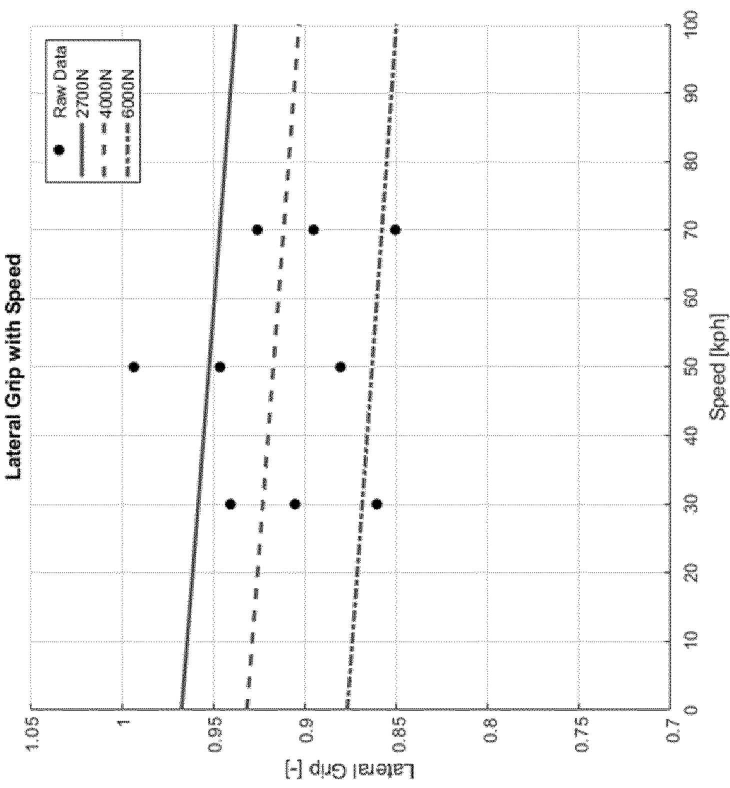
FIGS. 9-15 show experimental data collected for a second tire type on a wet road surface and compared with various tire models in same way as for FIGS. 2-8.
Figure 9:
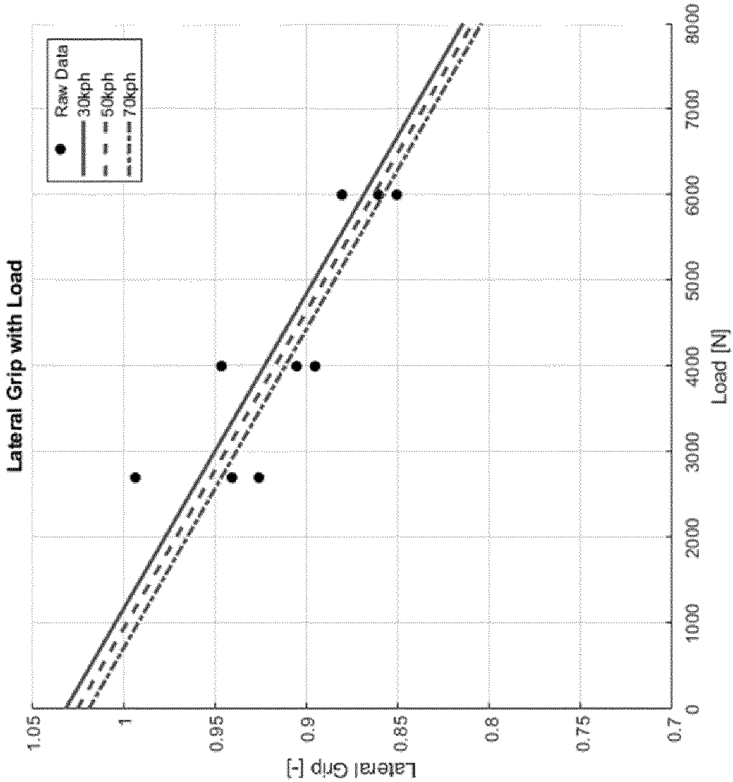
Figure 10:
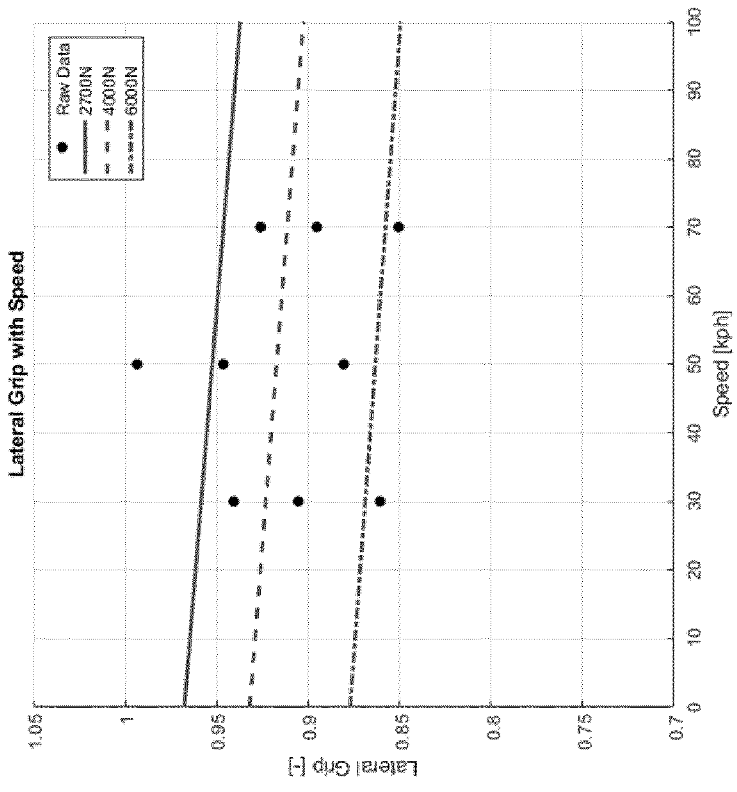
Figure 10:
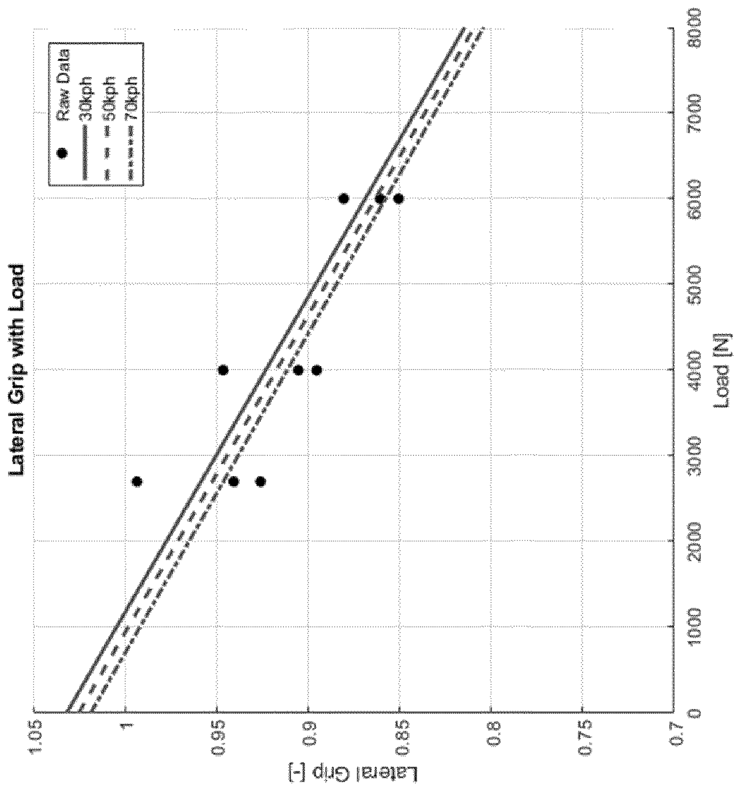
Figure 11:
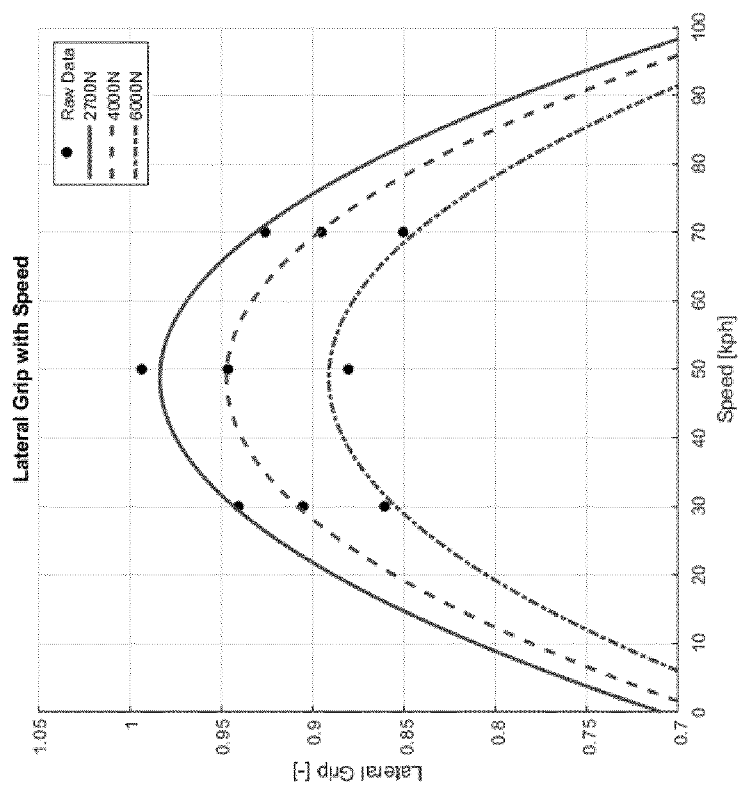
Figure 11:
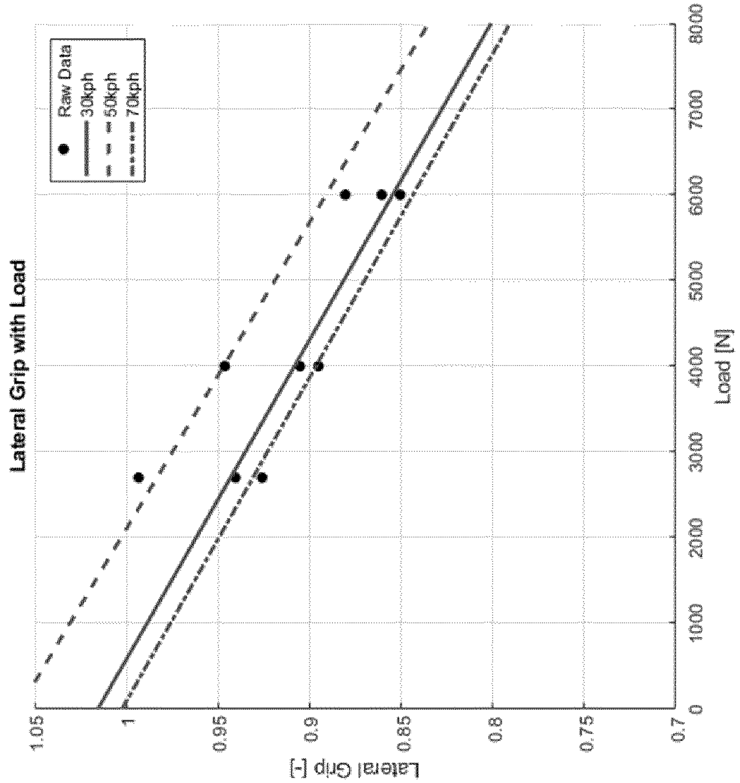
Figure 12:
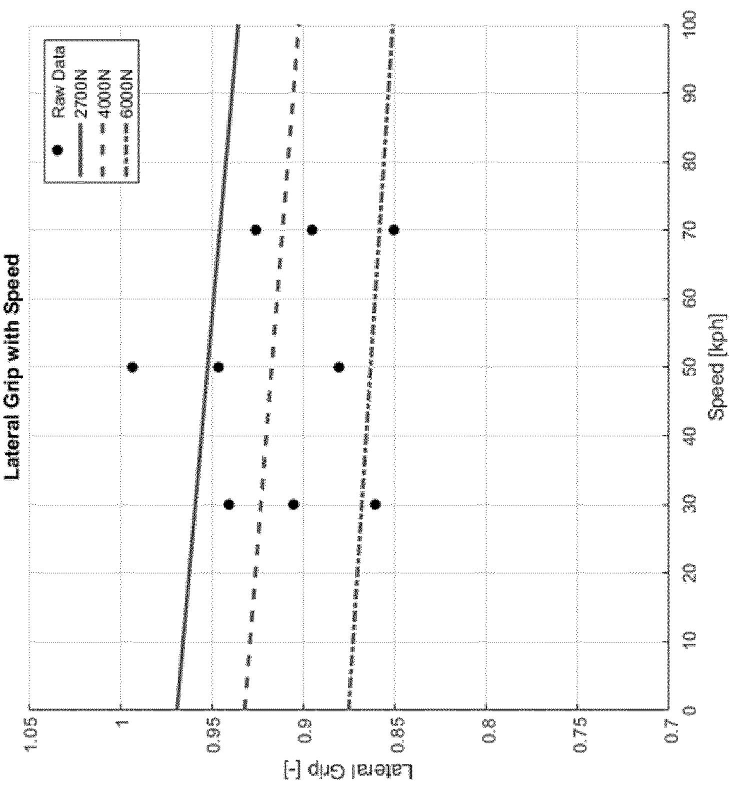
Figure 12:
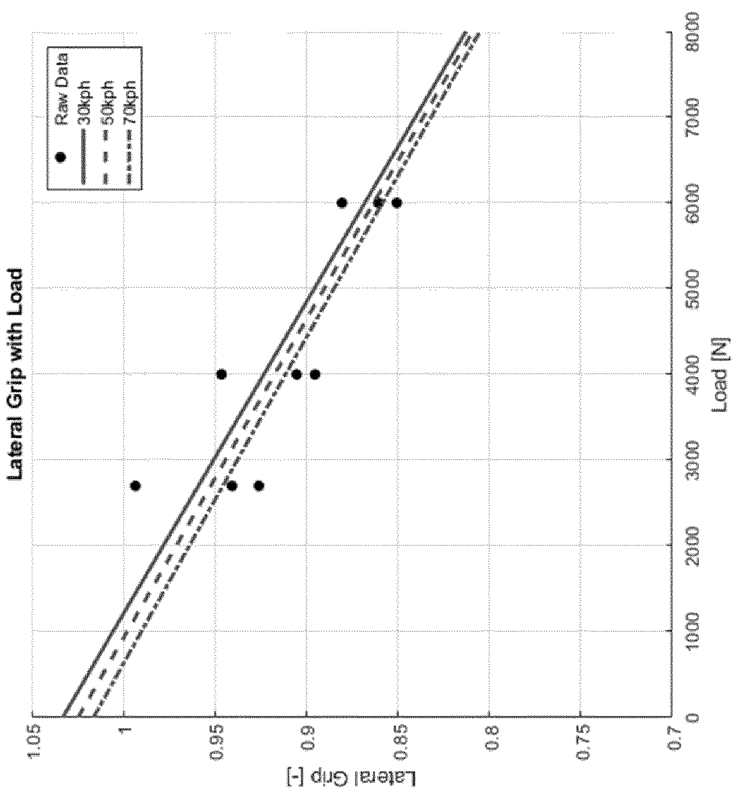
Figure 13:
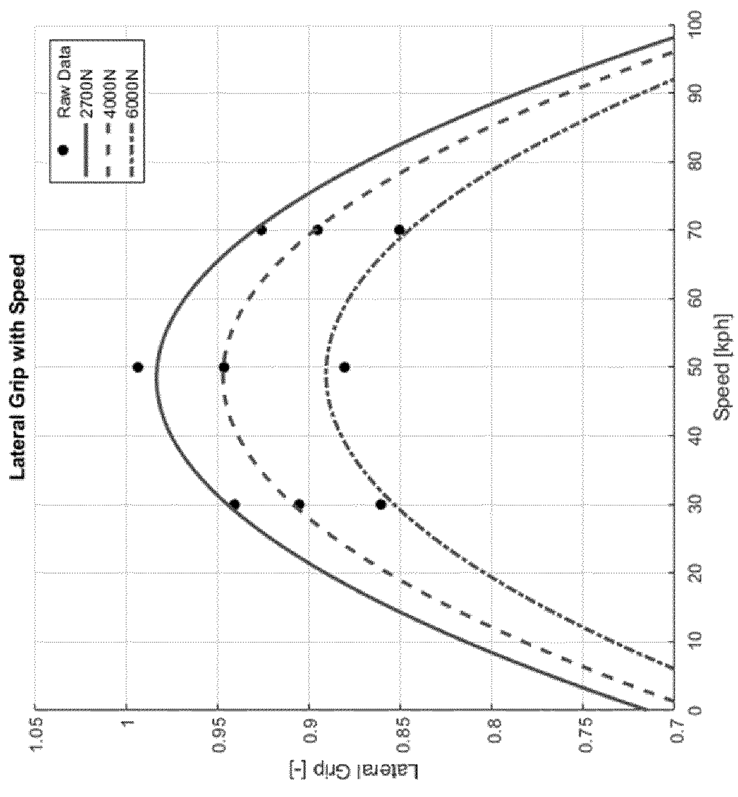
Figure 13:
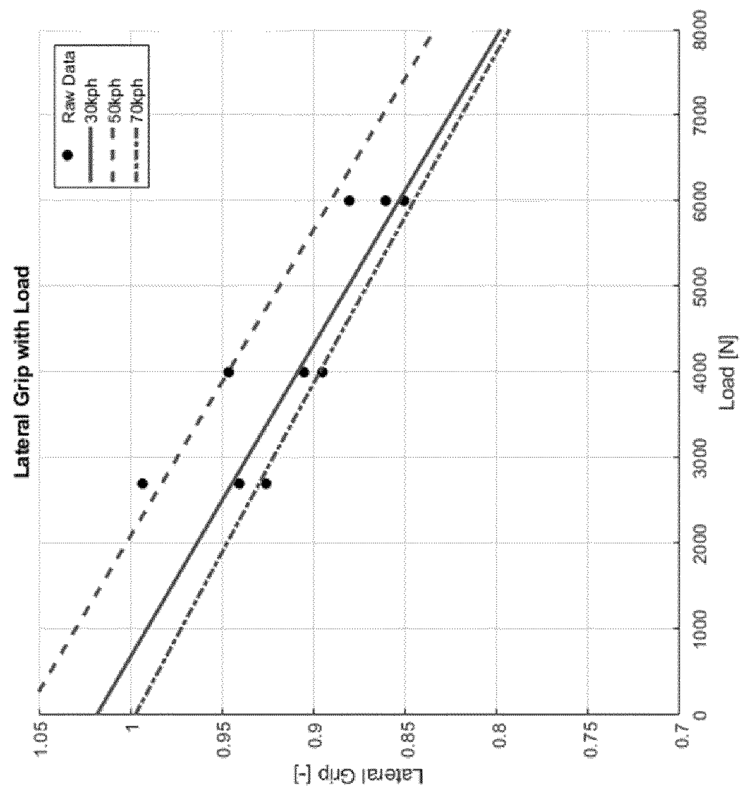
Figure 14:
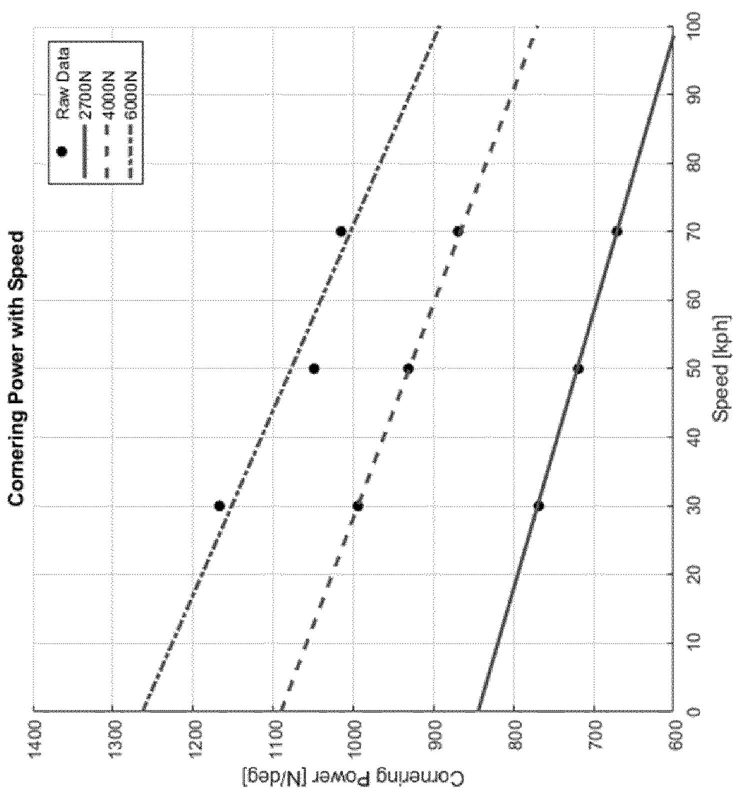
Figure 14:
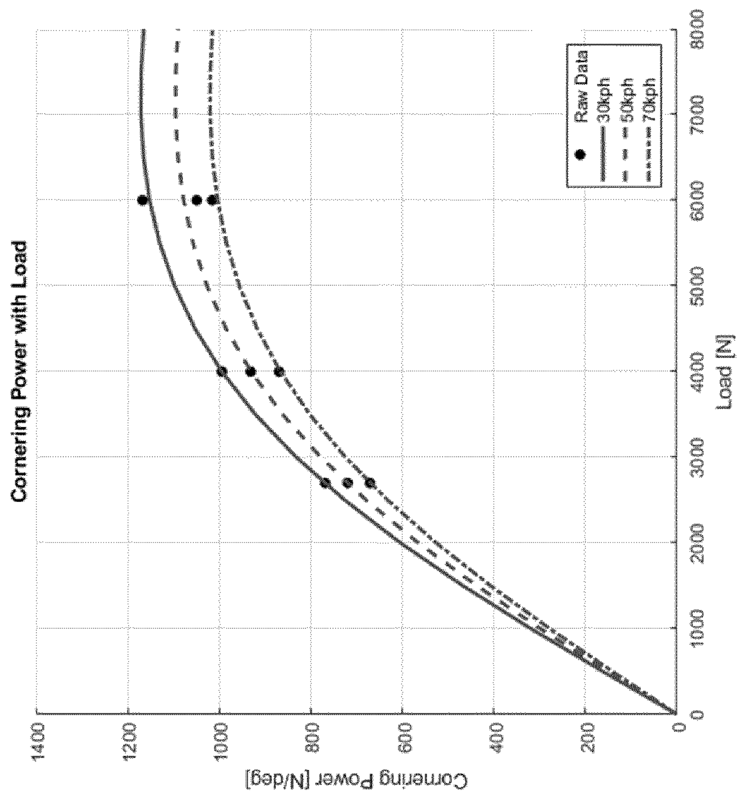
Figure 15:
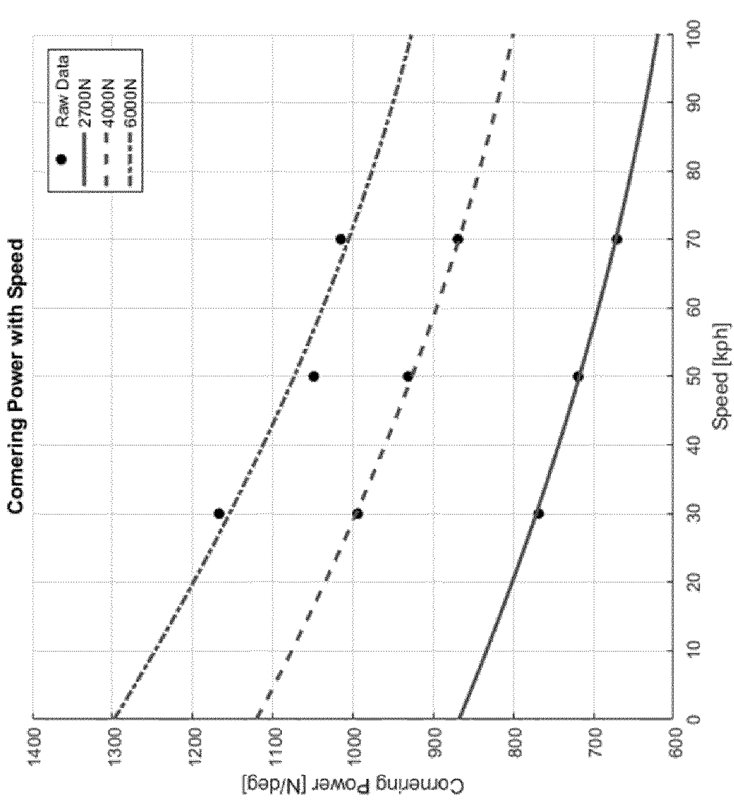
Figure 15:
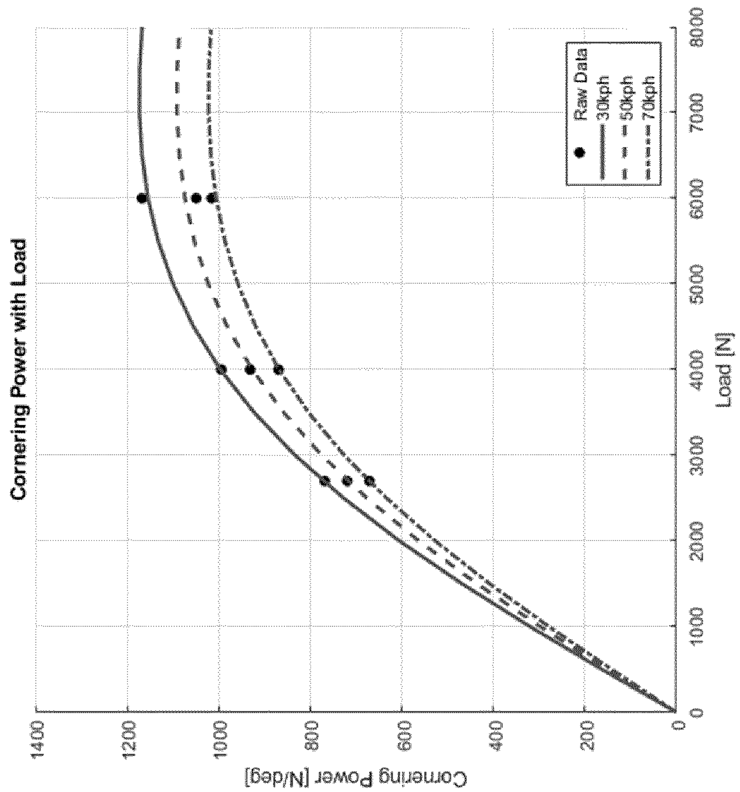

FIG. 7 compares the experimental data with a computer-implemented tire model according to another example of the present invention in terms of cornering stiffness $K_y$. As is well known in this technical field, the cornering stiffness is defined as the slope of the cornering force at the origin. In this example, the tire model predicts the cornering stiffness $K_y$ based on a primary term that has a linear dependence on the vertical tire load $F_z$ (in the same way as the Magic Formula) and a secondary term that has a linear dependence on the longitudinal tire velocity v:

$$K_y = p_{Ky1} \cdot F_{z0} \cdot \sin\left(2\arctan\left(\frac{F_z}{p_{Ky2} \cdot F_{z0}}\right)\right) (1 - p_{Ky3} \cdot |\gamma|) \cdot \lambda_{Ky} \cdot (1 + p_{VKy1} \cdot dv) \quad \text{(Eq. 6)}$$

The addition of the secondary term to the primary term is seen from FIG. 7 to provide a good fit to the experimental data collected on a wet road surface.

FIG. 8 compares the experimental data with a computer-implemented tire model according to yet another example of the present invention in terms of cornering stiffness $K_y$. In this example, the tire model predicts the cornering stiffness $K_y$ based on a primary term that has a linear dependence on the vertical tire load $F_z$ (in the same way as the Magic Formula), a secondary term that has a linear dependence on the longitudinal tire velocity v, and a tertiary term that has a quadratic dependence on the longitudinal tire velocity v:

$$K_y = p_{Ky1} \cdot F_{z0} \cdot \sin\left(2\arctan\left(\frac{F_z}{p_{Ky2} \cdot F_{z0}}\right)\right) (1 - p_{Ky3} \cdot |\gamma|) \cdot \lambda_{Ky} \cdot \left(1 + p_{VKy1} \cdot dv + p_{VKy2} \cdot dv^2\right) \quad \text{(Eq. 7)}$$

The addition of the secondary term and the tertiary term to the primary term is seen from FIG. 8 to provide a good fit to the experimental data collected on a wet road surface.

In equations 6 and 7 above, there is included some dimensionless coefficients $p_{Ky1}$, $p_{Ky2}$, $p_{Ky3}$ in the first term that depends on vertical tire load $F_z$. It is already known for tire models based on the "Magic Formula" to include such dimensionless coefficients, but previously these coefficients were pre-calculated based on experimental data collected on a dry road surface. In the present examples, the dimensionless coefficients $p_{Ky1}$, $p_{Ky2}$, $p_{Ky3}$ are pre-calculated based on experimental data collected for a given tire type on a wet road surface, and thus differ from those already known for tire models based on the "Magic Formula". This follows from a recognition that the grip level of a tire (i.e. the lateral friction coefficient) reaches different values on dry surfaces as compared to wet surfaces, thus the absolute values of these coefficients change if you test a tire on a surface dry or on a wet surface. The experimental data used to pre-calculate these dimensionless coefficients may relate to a single vehicle speed or multiple vehicle speeds, for example at least three different vehicle speeds.

In equation 6, there is included a further dimensionless coefficient $p_{vKdy1}$ in the secondary (linear) speed-dependent term. In equation 7, there is included another further dimensionless coefficient $p_{vKdy2}$ in the tertiary (quadratic) speed-dependent term. These further dimensionless coefficients are pre-calculated based on experimental data collected for a given tire type on a wet road surface. Furthermore, due to the speed-dependence of the secondary and tertiary terms, the experimental data used to pre-calculate these dimensionless coefficients may relate to multiple vehicle speeds, for example at least three different vehicle speeds.

As mentioned above, the way in which such dimensionless coefficients are pre-calculated from experimental data is generally known in the art. For example, a least squares fitting or other iterative fitting technique may be employed.

FIGS. 9-15 show experimental data collected for a second tire type with a different pattern design and different size (Bridgestone tire type 2) on a wet road surface and compared with the same tire models as described above in relation to FIGS. 2-8. It can be seen from these Figures that the tire models using Equations 2 to 7 again provide a good fit to the experimental data collected on a wet road surface for this different tire type.

The invention claimed is:

1. A computer-implemented method of predicting behaviour of a vehicle tire on a wet road surface, the method comprising:

providing a computer-implemented tire model;

inputting a vertical tire load and a longitudinal tire velocity to the tire model;

using the computer-implemented tire model to calculate a predicted tire grip in terms of a lateral load-dependent friction coefficient being dependent on the vertical tire load and being dependent on the longitudinal tire velocity, wherein the lateral load-dependent friction coefficient is calculated based on a first term that has a linear dependence on the vertical tire load and another term being dependent on the longitudinal tire velocity in a linear and/or non-linear way;

outputting the predicted tire grip from the computer-implemented tire model; and using the predicted tire grip in a vehicle simulation to simulate behavior of the vehicle tire on the wet road surface.

2. The computer-implemented method of claim 1, wherein the lateral load-dependent friction coefficient is further calculated based on another term that has a quadratic dependence on the longitudinal tire velocity.

3. The computer-implemented method of claim 1, wherein the lateral load-dependent friction coefficient is calculated based on a mixed term that is dependent on a product of the vertical tire load and the longitudinal tire velocity.

4. The computer-implemented method of claim 1, further comprising:

using the computer-implemented tire model to calculate a predicted cornering stiffness dependent on the vertical tire load and on the longitudinal tire velocity; and outputting the predicted cornering stiffness from the computer-implemented tire model.

5. The computer-implemented method of claim 4, wherein the cornering stiffness is calculated based on a primary term that has a linear dependence on the vertical tire load and a secondary term that has a linear dependence on the longitudinal tire velocity.

6. The computer-implemented method of claim 4, wherein the cornering stiffness is calculated based on a primary term that has a linear dependence on the vertical tire load and a tertiary term that has a quadratic dependence on the longitudinal tire velocity.

7. The computer-implemented method of claim 1, comprising:

using the computer-implemented tire model to calculate a predicted tire cornering force in terms of both the lateral load-dependent friction coefficient and cornering stiffness being dependent on the vertical tire load and being dependent on the longitudinal tire velocity; and outputting the predicted tire cornering force from the computer-implemented tire model.

8. The computer-implemented method of claim 1, comprising:

providing a computer-implemented tire model that includes one or more dimensionless coefficients that have been pre-calculated based on experimental data collected for a given tire on a wet road surface.

9. The computer-implemented method of claim 8, wherein the one or more dimensionless coefficients have been pre-calculated based on experimental data collected for a given tire on a wet road surface at multiple different longitudinal tire velocities.

10. The computer-implemented method of claim 1, comprising:

inputting a longitudinal tire velocity to the tire model in real time; and outputting the predicted tire grip from the computer-implemented tire model in real time.

11. A computer system comprising a processor and a tangible memory storing computer-executable instructions that, when executed by the processor, cause the computer system to:

input a vertical tire load and a longitudinal tire velocity to a tire model;

use the tire model to calculate a predicted tire grip in terms of a lateral load-dependent friction coefficient being dependent on the vertical tire load and being dependent on the longitudinal tire velocity, wherein the lateral load-dependent friction coefficient is calculated based on a first term that has a linear dependence on the vertical tire load and another term being dependent on the longitudinal tire velocity in a linear and/or non-linear way;

output the predicted tire grip from the tire model; and use the predicted tire grip in a vehicle simulation to simulate behavior of the vehicle tire on the wet road surface.

12. The computer system of claim 11, wherein the lateral load-dependent friction coefficient is further calculated based on another term that has a quadratic dependence on the longitudinal tire velocity.

13. The computer system of claim 11, wherein the lateral load-dependent friction coefficient is calculated based on a mixed term that is dependent on a product of the vertical tire load and the longitudinal tire velocity.

14. The computer system of claim 11, wherein the computer-executable instructions, when executed by the processor, further cause the computer system to:

use the tire model to calculate a predicted cornering stiffness dependent on the vertical tire load and on the longitudinal tire velocity; and output the predicted cornering stiffness from the tire model.

15. The computer system of claim 14, wherein the cornering stiffness is calculated based on a primary term that has a linear dependence on the vertical tire load and a secondary term that has a linear dependence on the longitudinal tire velocity.

16. The computer system of claim 14, wherein the cornering stiffness is calculated based on a primary term that has a linear dependence on the vertical tire load and a tertiary term that has a quadratic dependence on the longitudinal tire velocity.

17. The computer system of claim 11, wherein the computer-executable instructions, when executed by the processor, further cause the computer system to:

use the tire model to calculate a predicted tire cornering force in terms of both the lateral load-dependent friction coefficient and cornering stiffness being dependent on the vertical tire load and being dependent on the longitudinal tire velocity; and output the predicted tire cornering force from the tire model.

* * * * *